United States Patent
Kayahara

(10) Patent No.: US 10,913,268 B2
(45) Date of Patent: Feb. 9, 2021

(54) PRINTING APPARATUS AND VOLTAGE DETERMINATION METHOD

(71) Applicant: SEIKO EPSON CORPORATION, Tokyo (JP)

(72) Inventor: Naoki Kayahara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/424,591

(22) Filed: May 29, 2019

(65) Prior Publication Data
US 2019/0366711 A1 Dec. 5, 2019

(30) Foreign Application Priority Data

May 31, 2018 (JP) .................. 2018-104420

(51) Int. Cl.
*B41J 2/045* (2006.01)
(52) U.S. Cl.
CPC ....... *B41J 2/04588* (2013.01); *B41J 2/04558* (2013.01); *B41J 2/04581* (2013.01); *B41J 2/04593* (2013.01)
(58) Field of Classification Search
CPC ............................ B41J 2/04593; B41J 2/0459
See application file for complete search history.

(56) References Cited

U.S. PATENT DOCUMENTS 5,823,690 A * 10/1998 Narushima .......... B41J 2/04581
400/120.07
6,126,263 A * 10/2000 Hotomi ................ B41J 2/04516
347/15

FOREIGN PATENT DOCUMENTS

JP 2004-284064 A 10/2004

* cited by examiner

*Primary Examiner* — Shelby L Fidler
(74) *Attorney, Agent, or Firm* — Global IP Counselors, LLP

(57) ABSTRACT

A printing apparatus includes a chip including a nozzle, and a control unit. The control unit is configured to perform printing on a medium by applying to the chip a predetermined voltage using a first driving waveform for discharging a small dot, judge, based on a density and a target density of the dot printed on the medium, whether the target density is attainable by a voltage change within an adjustable voltage range, and determine, in a case where the target density is not attained even when a voltage of an upper limit value of the adjustable voltage range is applied using the first driving waveform, an actual voltage to be used during final printing, with the driving waveform being changed over to a second driving waveform for discharging a large dot.

4 Claims, 11 Drawing Sheets

PRINTING APPARATUS AND VOLTAGE DETERMINATION METHOD

The present application is based on, and claims priority from JP Application Serial Number 2018-104420, filed May 31, 2018, the disclosure of which is hereby incorporated by reference herein in its entirety.

BACKGROUND

1. Technical Field

The present disclosure relates to a printing apparatus and a voltage determination method.

2. Related Art

There have been known ink-jet type printing apparatuses includes a chip including a nozzle, and configured to apply a voltage to the chip to discharge droplets toward a medium such as paper or a film and thus print an image or the like. In such a printing apparatus, regardless of a predetermined voltage applied, amounts of the droplets discharged may vary due to individual differences between the chips, resulting in failure to obtain a target density. For example, in JP-A-2004-284064, there is disclosed an image output apparatus as a printing apparatus configured to apply a measurement voltage obtained by adding or subtracting a predetermined difference to or from a standard value as a predetermined voltage to an ink jet head serving as a chip, and determine a voltage to be applied to the chip from an ink density of a printed image to achieve a predetermined density serving as a target density. Thus, reportedly, the ink density can be adjusted.

However, when the voltage to be applied to the chip is high, mist readily occurs. When the voltage to be applied to the chip is low, a meniscus becomes unstable and so-called missing dots, i.e., failure of droplet discharge from the nozzle, are more likely to occur. Thus, an adjustable voltage range serving as a range in which the voltage can be applied is set. In the printing apparatus described in JP-A-2004-284064, it is difficult to adjust the density beyond this adjustable voltage range. That is, the adjustment range of the density of the droplet is problematically narrow.

SUMMARY

A printing apparatus according to this patent application includes a chip including a nozzle, and a control unit including a voltage application unit configured to apply a voltage within an adjustable voltage range set for the chip to one of a first driving waveform for discharging a small dot within a first size range and a second driving waveform for discharging a large dot within a second size range including a size, which is larger than a largest dot within the first size range, to discharge a droplet from the nozzle. The control unit is configured to perform printing on a medium by applying to the chip a predetermined voltage using the first driving waveform, judge, based on a density of the dot printed on the medium and a target density, whether the target density is attainable by a voltage change within the adjustable voltage range, and, determine, in a case where the target density is not attained even when a voltage of an upper limit value of the adjustable voltage range is applied using the first driving waveform, an actual voltage to be used during final printing, with the driving waveform being changed over to the second driving waveform.

A printing apparatus according to this patent application includes a chip including a nozzle, and a control unit including a voltage application unit configured to apply a voltage within an adjustable voltage range set for the chip to one of a first driving waveform for discharging a small dot within a first size range and a second driving waveform for discharging a large dot within a second size range including a size, which is larger than a largest dot within the first size range, to discharge a droplet from the nozzle. The control unit is configured to perform printing on a medium by applying to the chip a predetermined voltage using the second driving waveform, judge, based on a density of the dot printed on the medium and a target density, whether the target density is attainable by a voltage change within the adjustable voltage range, and determine, in a case where the target density is not attained even when a voltage of a lower limit value of the adjustable voltage range is applied using the second driving waveform, an actual voltage to be used during final printing, with the driving waveform being changed over to the first driving waveform.

Preferably, in the printing apparatus described above, the first size range and the second size range overlap.

Preferably, the printing apparatus described above further includes a measurement unit configured to measure a density of the dot printed on the medium.

A voltage determination method according to this patent application is a voltage determination method of determining a voltage to be applied during final printing in a printing apparatus including a chip including a nozzle, and a control unit including a voltage application unit configured to apply a voltage within an adjustable voltage range set for the chip to one of a first driving waveform for discharging a small dot within a first size range and a second driving waveform for discharging a large dot within a second size range including a size, which is larger than a largest dot within the first size range, to discharge a droplet from the nozzle. The voltage determination method includes performing printing on a medium by applying to the chip a predetermined voltage using the first driving waveform, judging, based on a density of the dot printed on the medium and a target density, whether the target density is attainable by a voltage change within the adjustable voltage range, and, determining, in a case where the target density is not attained even when a voltage of an upper limit value of the adjustable voltage range is applied using the first driving waveform, an actual voltage to be used during final printing, with the driving waveform being changed over to the second driving waveform.

A voltage determination method according to this patent application is a voltage determination method of determining a voltage to be applied during final printing in a printing apparatus including a chip including a nozzle, and a control unit including a voltage application unit configured to apply a voltage within an adjustable voltage range set for the chip to one of a first driving waveform for discharging a small dot within a first size range and a second driving waveform for discharging a large dot within a second size range including a size, which is larger than a largest dot within the first size range, to discharge a droplet from the nozzle. The voltage determination method includes performing printing on a medium by applying to the chip a predetermined voltage using the second driving waveform, judging, based on a density of the dot printed on the medium and a target density, whether the target density is attainable by a voltage change within the adjustable voltage range, and determining, in a case where the target density is not attained even when a voltage of a lower limit value of the adjustable voltage range is applied using the second driving waveform, an actual voltage to be used during final printing, with the driving waveform being changed over to the first driving waveform.

DESCRIPTION OF EXEMPLARY EMBODIMENTS

Exemplary embodiments of the present disclosure will be described below with reference to the accompanying drawings. Note that, in each of the figures below, to illustrate each of layers or each of members at a recognizable size, a scale of each of the layers or each of the members is different from an actual scale.

Figure 1:
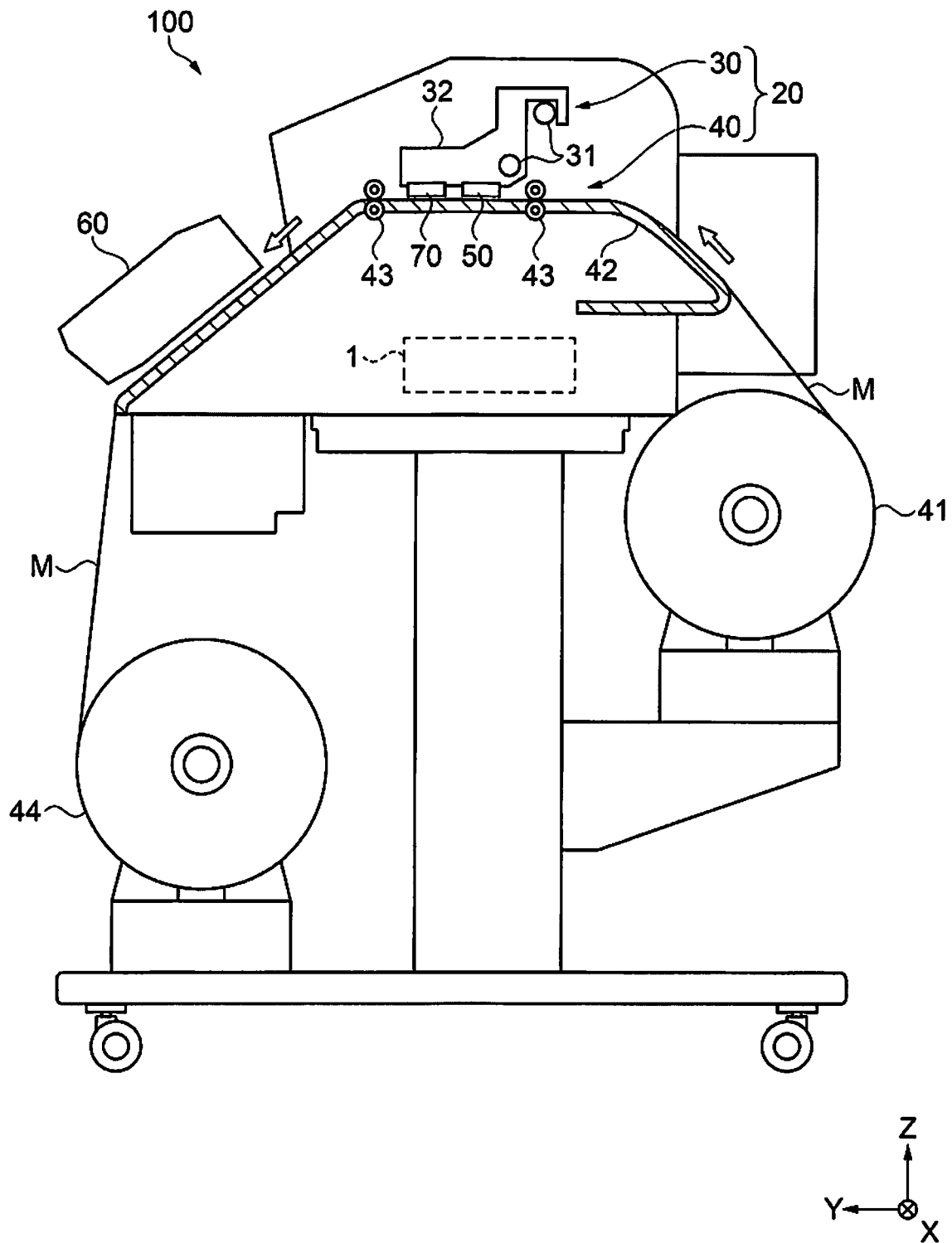
FIG. 1 is a cross-sectional view illustrating a schematic configuration of a printing apparatus according to exemplary embodiment 1.
Figure 2:
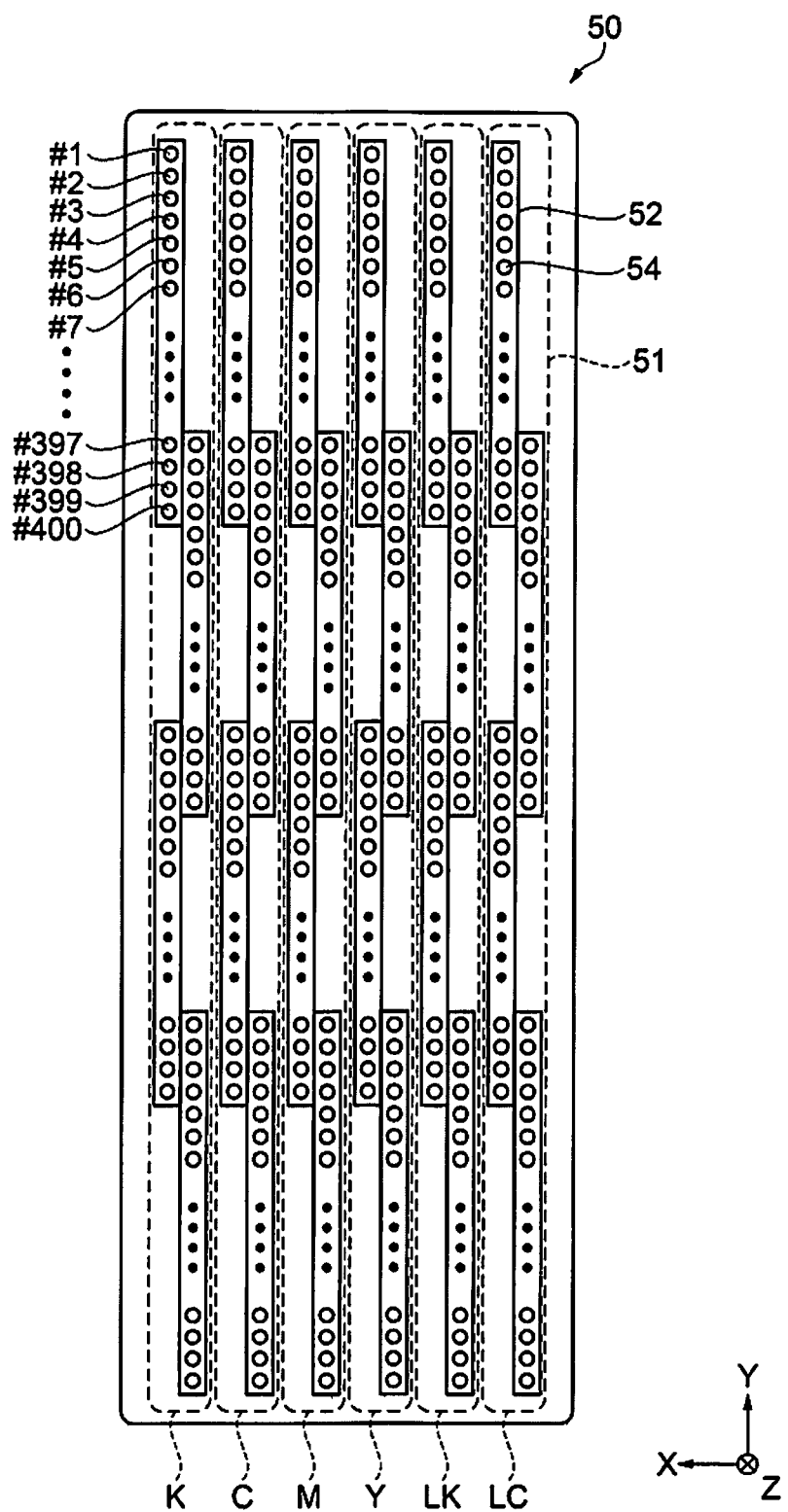
FIG. 2 is a plan view illustrating a schematic configuration of a head unit.
Figure 3:
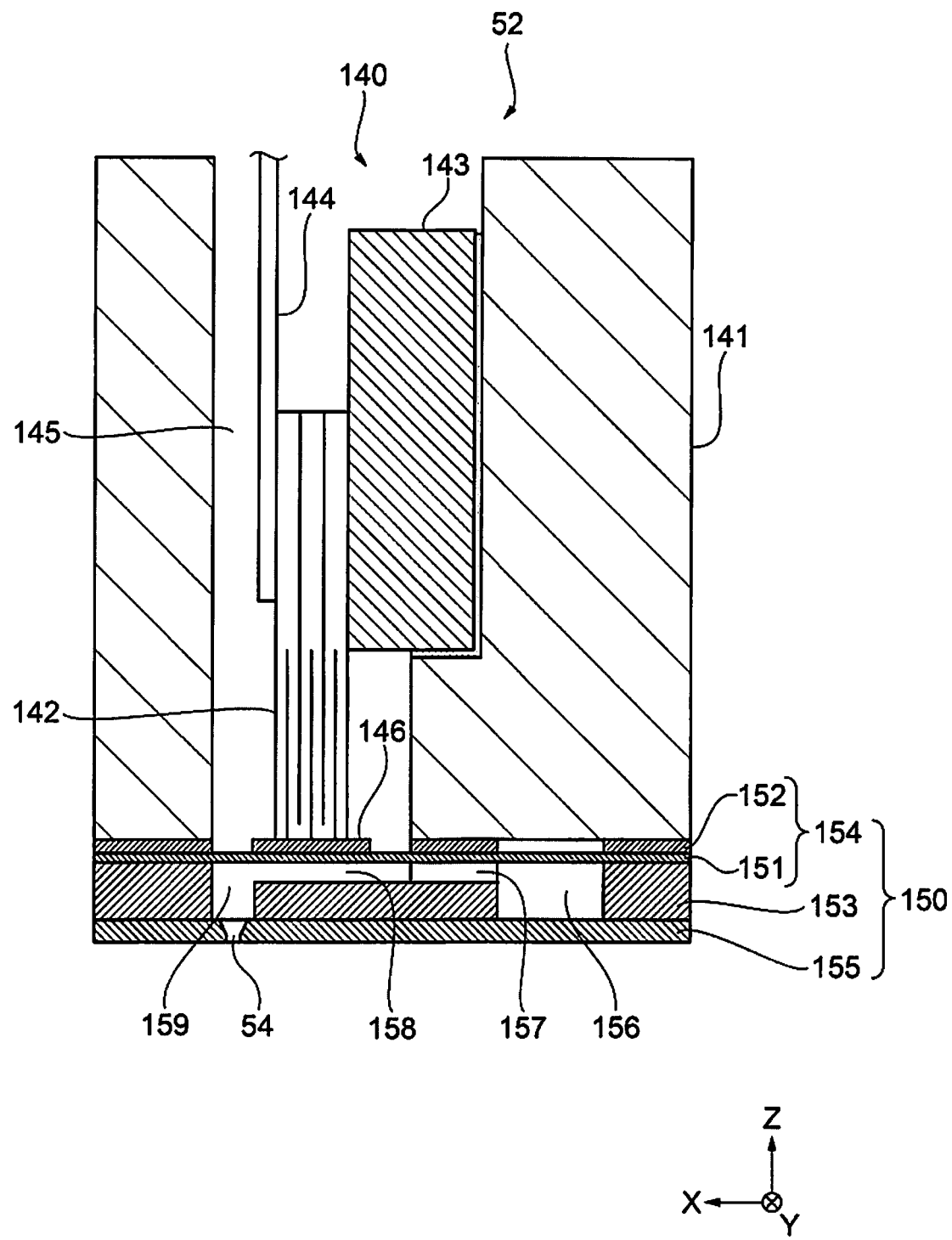
FIG. 3 is a cross-sectional view illustrating an internal configuration of a chip.

FIG. 1 to FIG. 3 illustrate an X axis, a Y axis, and a Z axis as three axes orthogonal to one another for the convenience of explanation, where the tip end side of an arrow indicating the axial direction is defined as a "+ side" and the base end side as a "− side". Herein, a direction parallel to the X axis is referred to as an "X axis direction", a direction parallel to the Y axis as a "Y axis direction", and a direction parallel to the Z axis as a "Z axis direction".

Exemplary Embodiment 1

Configuration of Printing Apparatus

FIG. 1 is a cross-sectional view illustrating a schematic configuration of a printing apparatus according to Exemplary Embodiment 1. As illustrated in FIG. 1, a printing apparatus 100 includes a movement unit 20, a head unit 50, a heating unit 60, an imaging unit 70 as a measurement unit, and a control unit 1.

The movement unit 20 executes movement of a medium M and the head unit 50 to print an image on the medium M. The movement unit 20 includes a sub scanning unit 40 and a main scanning unit 30. The sub scanning unit 40 transports the medium M in a transport direction denoted by a hollow arrow to pass the medium M in a vicinity of the head unit 50 and a vicinity of the heating unit 60. Note that, in the present exemplary embodiment, the Z axis is an up and down direction in the gravity direction. The Y axis is a transport direction of the medium M in passing the vicinity of the head unit 50. Further, the X axis is a direction intersecting both the Z axis and the Y axis. Further, positional relationships in the transport direction of the medium M are also referred to as "upstream" and "downstream".

The sub scanning unit 40 includes a feeding unit 41, a support unit 42, a plurality of pairs of transport rollers 43, and a winding unit 44. The support unit 42 faces the head unit 50, and supports the medium M being transported in the transport direction from below. The feeding unit 41 is disposed upstream of the head unit 50. Using a driving motor (not illustrated), the feeding unit 41 rotates the medium M that is wound in a roll shape to feed the same along the support unit 42. The plurality of pairs of transport rollers 43 are disposed upstream and downstream of the head unit 50, and pinch the medium M. The pair of transport rollers 43 are rotated by the driving motor (not illustrated), and transport the medium M on the support unit 42 to the + side in the Y axis direction, which is the transport direction. The winding unit 44 is disposed downstream of the heating unit 60 described later. The winding unit 44 is rotated by a driving motor (not illustrated), and winds the medium M after printing, which separates from the support unit 42, into a roll shape. Note that, in this printing apparatus 100, a vinyl chloride film and the like having a width of about 64 inches is used as the medium M, for example.

The main scanning unit 30 moves a carriage 32 along the X axis direction, which is a main scanning direction, with respect to the medium M. The main scanning unit 30 includes a guide shaft 31 and the carriage 32. The guide shaft 31 is configured by two stick-shaped members, and has a longitudinal direction disposed in parallel with the X axis direction. The guide shaft 31 supports the carriage 32 to be movable. The main scanning unit 30 includes a movement mechanism (not illustrated) configured to move the carriage 32. As the moving mechanism, a mechanism including a combination of a ball screw and a ball nut, a linear guide mechanism, or the like may be employed. Further, the main scanning unit 30 includes a carriage motor (not illustrated) as a power source for moving the carriage 32. The carriage 32 is driven by the carriage motor, and reciprocates along the guide shaft 31 in the X axis direction. The head unit 50 is mounted on the carriage 32 and faces the medium M. Thus, the head unit 50 reciprocates in the X axis direction, along with the reciprocating action of the carriage 32.

The heating unit 60 is disposed downstream of the head unit 50 in the transport direction of the medium M. The heating unit 60 heats the medium M having passed through the head unit 50, and evaporates and dries solvent components of the ink discharged on the medium M. The heating unit 60 includes a heating element (not illustrated) inside, and blows heated air and radiates infrared rays to heat the medium M. Note that one of the blow of the heated air and the radiation of the infrared rays may be omitted, and a heating apparatus employing any other method may be used as the heating unit 60. Further, a length of the heating unit 60 in the X axis direction is configured to be the same as or longer than a width of the medium M in the X axis direction.

The imaging unit 70 captures a dot group formed on the medium M, that is, an image printed on the medium M, to measure a density of a dot printed on the medium M. The density of the dot is expressed by a brightness L* from image data captured by the imaging unit 70 and calculations of a central processing unit (CPU) 3 described later. The imaging unit 70 is disposed on a face of the carriage 32 facing the medium M, and captures an image of the medium M when the carriage 32 moves in the X axis direction. A length of an imaging range of the imaging unit 70 in the X axis direction is shorter than a width of the medium M in the X axis direction. The imaging unit 70 captures an image of an entire region of the medium M in the X axis direction by continually capturing images while moving in the X axis direction along with the carriage 32. In the present exemplary embodiment, the imaging unit 70 is configured by an area sensor. Note that the imaging unit 70 may be configured by a line sensor in place of the area sensor.

FIG. 2 is a plan view illustrating a schematic configuration of the head unit. Next, a configuration of the head unit 50 will be described with reference to FIG. 2. Note that FIG. 2 is a schematic diagram of the head unit 50 as viewed from a lower surface on the − side in the Z axis direction.

The head unit 50 includes six nozzle rows 51 that discharge ink of six colors: black (K), cyan (C), magenta (M), yellow (Y), gray (LK), and light cyan (LC). The nozzle rows 51 are each configured by four chips 52 each including a nozzle 54. The chip 52 is provided with 400 of the nozzles 54 (#1 to #400) at a predetermined nozzle pitch along the Y axis direction. The four chips 52 are in a staggered arrangement along the Y axis direction so that the positions of some nozzles 54 in the X axis direction provided at a lower end and an upper end of the chips 52 adjacent to one other overlap one another. The chip 52 is manufactured by, for example, a micro electro mechanical systems (MEMS) manufacturing process applying a semiconductor process with a silicon wafer being as a basic material. Note that the configuration of the head unit 50 is an example, and is not limited to the example.

FIG. 3 is a cross-sectional view illustrating an internal configuration of the chip. Next, an internal configuration of the chip 52 will be described with reference to FIG. 3.

As illustrated in FIG. 3, the chip 52 includes a vibrator unit 140 including, as a unit, a plurality of piezoelectric vibrators 142, a fixing plate 143, a flexible cable 144, and the like, a case 141 capable of accommodating the vibrator unit 140, and a flow channel unit 150 bonded to a tip face of the case 141. The case 141 is a block member made of a synthetic resin and provided with an accommodation space 145 including an open tip and an open end. The vibrator unit 140 is accommodated and fixed in the accommodation space 145.

The piezoelectric vibrators 142 are each formed in a comb-tooth shape elongated in a longitudinal direction. The piezoelectric vibrators 142 are laminated type piezoelectric vibrators are each configured by piezoelectric elements and inner electrodes alternately laminated one on another, and are longitudinal-vibration-mode piezoelectric vibrators stretchable in the Z axis direction, which is a longitudinal direction orthogonal to a lamination direction. Then, a tip face of each of the piezoelectric vibrators 142 is bonded to an island part 146 of the flow channel unit 150. Note that the piezoelectric vibrators 142 behave in a manner similar to capacitors. That is, when supply of a signal is stopped, potentials of the piezoelectric vibrators 142 are maintained at potentials used immediately before the supply of a signal is stopped.

The flow channel unit 150 is configured by the nozzle plate 155 disposed on the − side in the Z axis direction, which is one of face sides of a flow channel forming substrate 153, and an elastic plate 154 disposed on the + side in the Z axis direction, which is the other face side opposite to the face side on which the nozzle plate 155 is disposed, and the nozzle plate 155 and the elastic plate 154 are laminated one on another with the flow channel forming substrate 153 interposed between the nozzle plate 155 and the elastic plate 154. The nozzle plate 155 is bonded to the flow channel forming substrate 153 via an adhesive member. As the adhesive member, an epoxy adhesive, an acrylic adhesive, or the like can be adopted.

The nozzle plate 155 is configured by a thinner stainless-steel or silicon provided with the plurality of nozzles 54 formed along the Y axis direction. The flow channel forming substrate 153 is a plate member provided with a series of ink flow channels each including a common ink chamber 156, an ink supplying port 157, a pressure chamber 158, and a nozzle communication port 159. In the present exemplary embodiment, the flow channel forming substrate 153 is prepared by etching a silicon wafer. The elastic plate 154 includes a composite plate material of a double structure including a resin film 151 laminated on a support plate 152 made of stainless-steel, and includes the island part 146 formed by forming the support plate 152 in a ring shape at a portion corresponding to the pressure chamber 158.

In the chip 52, the series of ink flow channels passing from the common ink chamber 156, through the pressure chamber 158, to the nozzles 54 are each formed for each of the nozzles 54. Then, the piezoelectric vibrators 142 are electrically charged and discharged, and thus the piezoelectric vibrators 142 deforms. That is, the piezoelectric vibrators 142 of a longitudinal vibration mode contract in a vibrator longitudinal direction through the charging, and stretch in the vibrator longitudinal direction through the discharging. Accordingly, when a potential rises through the charging, the island part 146 is pulled toward the piezoelectric vibrators 142 side, and the resin film 151 around the island part 146 deforms, and then the pressure chamber 158 expands. Moreover, when the potential lowers through the discharging, the pressure chamber 158 contracts.

Thus, since a volume of the pressure chamber 158 can be controlled in accordance with a potential, pressure fluctuation can be caused in ink in the pressure chamber 158, and the ink can be discharged from the nozzles 54. For example, once the pressure chamber 158 having a normal capacity (reference volume) is caused to expand, the pressure chamber 158 is then caused to promptly contract and thus, ink droplets are discharged and dots are formed on the medium M.

Note that in the present exemplary embodiment, the configuration using the piezoelectric vibrators 142 of a longitudinal vibration type is described as an example, but is not limited to this example. For example, flexural-deformation type piezoelectric vibrators each including a lower electrode, a piezoelectric layer, and an upper electrode laminated and formed one on another may be used.

Figure 4:
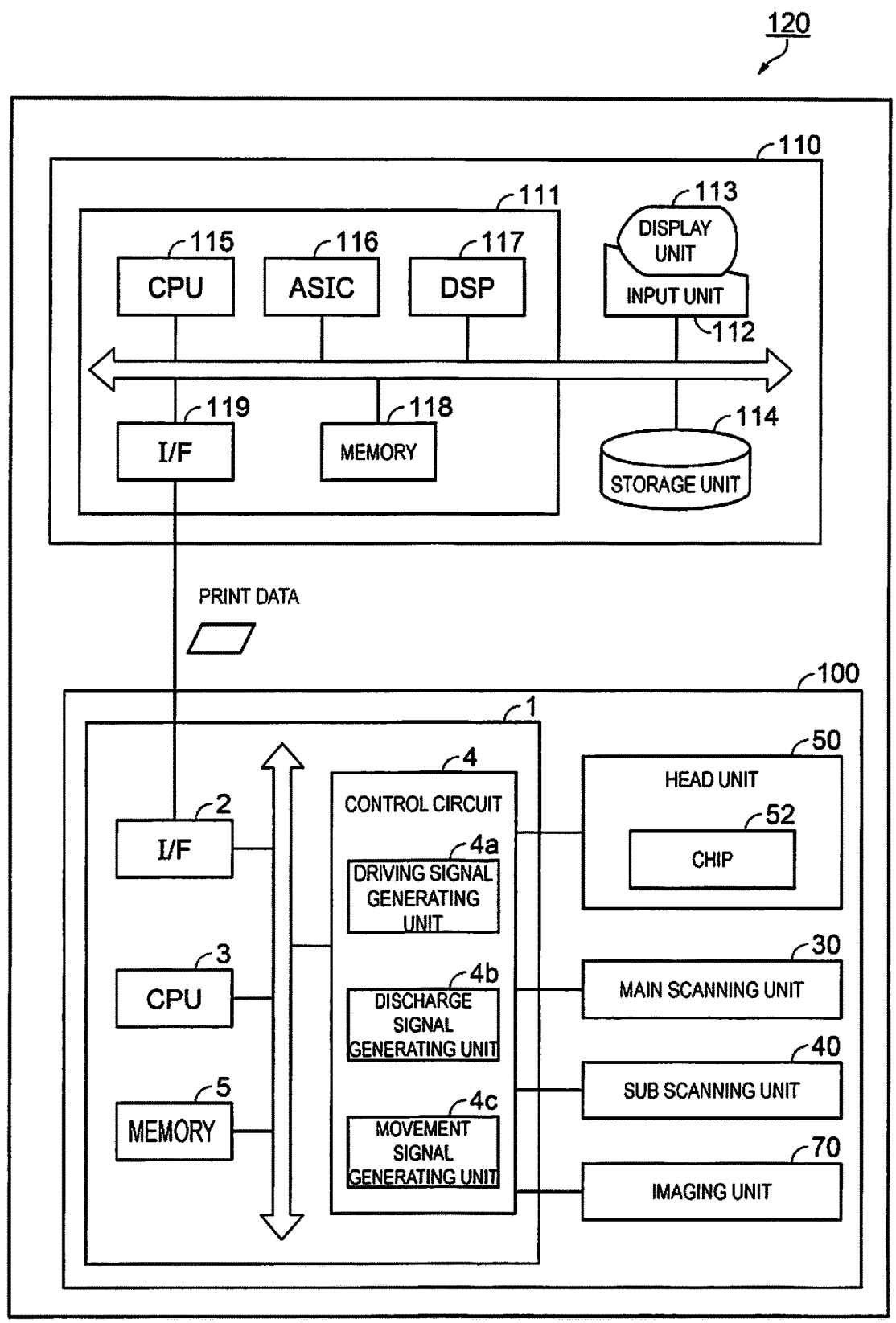
FIG. 4 is a block diagram illustrating a schematic configuration of the printing apparatus.

FIG. 4 is a block diagram illustrating a schematic configuration of the printing apparatus. Next, an electrical configuration of the printing apparatus 100 will be described with reference to FIG. 4.

The printing apparatus 100 prints an image on the medium M based on print data input from a print control apparatus 110 illustrated in FIG. 4.

The print control apparatus 110 includes a printer control unit 111, an input unit 112, a display unit 113, a storage unit 114, and the like. As the print control apparatus 110, a personal computer or the like can be used. The print control apparatus 110 may be configured to be provided to a same housing as the printing apparatus 100.

The printer control unit 111 controls the input unit 112 and the display unit 113 as well as print jobs printed by the printing apparatus 100, and cooperates with the control unit 1 of the printing apparatus 100 to control an entire printing system 120. A software operated by the print control apparatus 110 includes general image processing application software (hereinafter referred to as an application) that deals with the image data to be printed, and a printer driver software (hereinafter referred to as a printer driver) that generates print data for causing the printing apparatus 100 to execute printing.

The printer control unit 111 includes a CPU 115, an application specific integrated circuit (ASIC) 116, a digital signal processor (DSP) 117, a memory 118, and an interface unit (I/F) 119, and the like, and performs centralized management of the entire printing system 120. The display unit 113 is configured by a liquid crystal display, for example. The display unit 113 displays an information input from the input unit 112, images to be printed on the printing apparatus 100, and the like, under the control of the printer control unit 111.

The input unit 112 is configured by a port that couples with a keyboard or an information input device, a touch panel provided to a front face of the display unit 113 (liquid crystal display), and the like. The input unit 112 functions as an image acquisition unit that acquires image data.

The display unit 113 displays various command options by graphical user interface (GUI) buttons and the like, and allows a user to input various commands by selecting the commands from the input unit 112.

The storage unit 114 is a rewritable storage medium such as a hard disk drive (HDD) or a memory card, and stores the software operated by the print control apparatus 110 (programs operated by the printer control unit 111), an image to be printed, and information related to the print job, and the like.

The memory 118 is a storage medium that secures a region for storing programs operated by the CPU 115, a work region in which such programs are operated, and the like, and is configured by storage elements such as a random access memory (RAM) and an electrically erasable programmable read only memory (EEPROM).

The printing apparatus 100 includes the control unit 1 that controls each unit included in the printing apparatus 100. The control unit 1 is configured to include an interface unit (I/F) 2, the CPU 3, a control circuit 4, a memory 5, and the like.

The interface unit 2 is configured to transmit/receive data between the print control apparatus 110 configured to handle input signals or images and the control unit 1, and receives print data and the like generated by the print control apparatus 110.

The CPU 3 is an arithmetic processing unit for processing various input signal, and controlling the entire printing apparatus 100 in accordance with programs stored in the memory 5 and print data received from the print control apparatus 110.

The memory 5 serving as a storage medium configured to secure a region for storing the program, a work region, or the like for the CPU 3, includes a storage element such as a RAM, an EEPROM, and the like.

The control circuit 4 is a circuit that generates a control signal for controlling the main scanning unit 30, the sub scanning unit 40, the imaging unit 70, and the like based on the print data and a calculation result of the CPU 3.

Further, the CPU 3 performs processing on image data of dots printed on the medium M captured by the imaging unit 70, and finds the brightness L* of a CIELAB color space serving as an index of the density of the dot.

The control circuit 4 includes a driving signal generating unit 4a as a voltage application unit, a discharge signal generating unit 4b, and a movement signal generating unit 4c.

The driving signal generating unit 4a is a circuit that generates one driving waveform of a first driving waveform and a second driving waveform described later that drive the piezoelectric vibrators 142 included in the chip 52. Voltage is applied to the generated driving waveform, and thus a droplet is discharged from the nozzle 54.

The discharge signal generating unit 4b is a circuit that generates a control signal for selecting the nozzle 54 for discharging ink, controlling the discharge timing, and the like, based on the print data and the calculation data of the CPU 3.

The movement signal generating unit 4c is a circuit that generates a control signal for controlling the main scanning unit 30 and the sub scanning unit 40 based on the print data and the calculation result of the CPU 3.

The control unit 1 forms a raster line of dots aligned in the X axis direction by performing main scanning that moves the carriage 32 in the X axis direction, which is the main scanning direction, while discharging ink from the nozzle 54, according to the control signal output from the control circuit 4. Further, the control unit 1 performs sub scanning that moves the carriage 32 to the + side in the Y axis direction, which is the transport direction of the medium M, according to the control signal output from the control circuit 4. A desired image based on image data is printed on the medium M by alternately performing this main scanning and sub scanning.

Note that while the present exemplary embodiment illustrates the configuration of the printing apparatus 100 that supplies the long medium M by a roll-to-roll method, the method is not limited to such a method. For example, the printing apparatus may be configured to supply a single paper cut to a predetermined length by a sheet feeding method, and may be configured to accommodate the medium M after printing in a discharge basket (not illustrated) attached in place of the winding unit 44.

Image Processing

Figure 5:
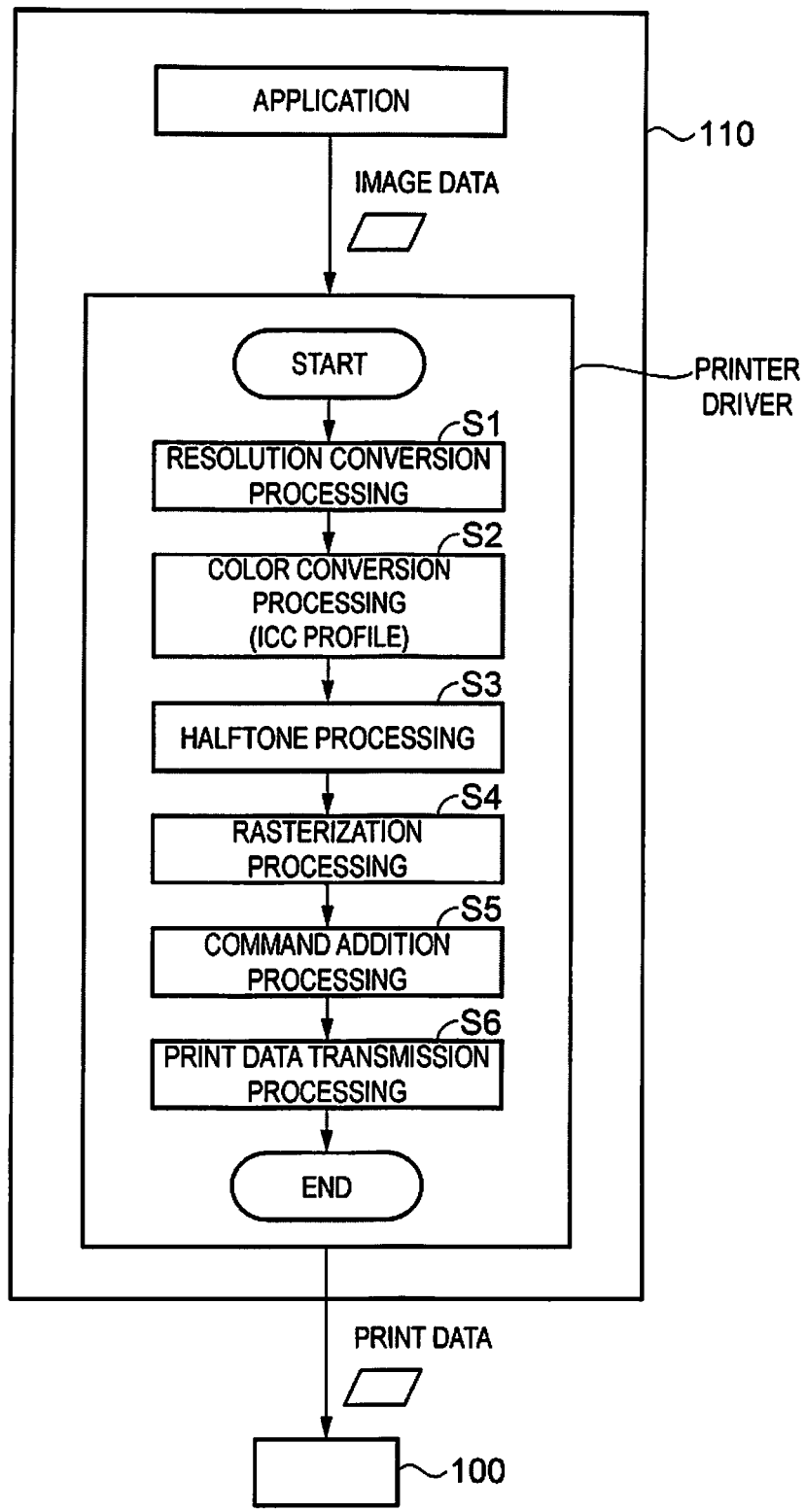
FIG. 5 is a diagram explaining image processing for printing an image.

FIG. 5 is a diagram for explaining image processing for printing an image. Next, with reference to FIG. 5, description is given of print data generation processing. The printing on the medium M is started by transmitting print data to the printing apparatus 100 from the print control apparatus 110. The print data is generated by a printer driver.

The printer driver receives the image data (text data, full color image data, and the like, for example) acquired by the input unit 112 from the application, converts the image data into print data in a format that the control unit 1 of the printing apparatus 100 can interpret, and outputs the print data to the control unit 1. For the conversion of the image data from the application into the print data, the printer driver performs resolution conversion processing, color conversion processing (international color consortium (ICC) profile generation), halftone processing, rasterization processing, command addition processing, and the like. That is, the printer driver includes a halftone processing unit for performing halftone processing based on image data as a function unit of software (or firmware), a print data generation unit for generating print data based on image data subjected to halftone processing, and the like (not illustrated).

The resolution conversion processing in step S1 is processing of converting the image data output from the application into a resolution (printing resolution) for printing the medium M. For example, when the printing resolution is specified as 720×720 dpi, vector format image data received from the application is converted into bit map format image data having a 720×720 dpi resolution. Each pixel data of the image data after the resolution conversion processing is configured by pixels arranged in a matrix pattern. Each pixel has a gray scale value in, for example, 256 gray scales in a RGB color space. That is, each piece of the pixel data after the resolution conversion indicates the gray scale value of the corresponding pixel.

Among the pixels arranged in the matrix pattern, the pixel data corresponding to one row of pixels aligned in a predetermined direction is called raster data. Note that the predetermined direction in which the pixels corresponding to the raster data are aligned corresponds to the movement direction (main scanning direction) of the head unit 50 when printing an image.

The color conversion processing in step S2 is processing of converting the RGB color space into data of a CMYK color space. As a system for performing this conversion, a color management system is used. The color management system converts a color space using an ICC profile, for example, describing the corresponding relationship of these color spaces. The color space conversion is performed by converting a dependent color space (RGB color space) dependent on a specific device that handles image data to an independent color space (a CIELAB color space, for example) not dependent on a device, and subsequently converting the independent color space to a color space (CMYK color space) of the printing apparatus 100 on the output side.

CMYK colors refers to cyan (C), magenta (M), yellow (Y), and black (K). The image data of the CMYK color system space is data corresponding to the colors of the ink of the printing apparatus 100. Therefore, when the printing apparatus 100 uses four types of ink of the CMYK color system, the printer driver generates image data in a four-dimensional space of the CMYK color system based on the RGB data. This color conversion processing is performed based on a table (color conversion look-up table LUT) in which the gray scale values of the RGB data and the gray scale values of the CMYK color system data are associated with each other. Note that the pixel data after the color conversion processing is, for example, the CMYK color system data of 256 gray scales expressed in the CMYK color system space.

The halftone processing in step S3 is processing of converting ink amount data of a large number of gray scales (256 gray scales) into data of a number of gray scales that can be formed by the printing apparatus 100. The halftone processing is performed by the halftone processing unit. Through this halftone processing, ink amount data expressing 256 gray scales is converted into 1-bit data expressing two gray scales ("DOT" and "NO DOT") and 2-bit data expressing four gray scales ("NO DOT", small dot, medium dot, and large dot). Specifically, a dot generation rate corresponding to the gray scale value is obtained from a dot generation rate table in which the gray scale values (0 to 255) and dot generation rates are associated with each other. Then, with the generation rate thus obtained, pixel data is created so that dots are formed in a distributed manner, by using a dither method, an error diffusion method, or the like. That is, the image data after halftone processing is 1-bit or 2-bit data, and this image data is a data indicating the formation of dots ("DOT" or "NO DOT", dot size) of each pixel. For example, for 2 bits (four gray scales), the data is converted to four steps, such as a dot gray scale value [00] corresponding to "NO DOT", a dot gray scale value [01] corresponding to the formation of a small dot, a dot gray scale value [10] corresponding to formation of a medium dot, and a dot gray scale value [11] corresponding to formation of a large dot. Note that the printing apparatus 100 of the present exemplary embodiment performs printing using the two gray scales of "DOT" and "NO DOT", and thus 1-bit data is generated in the halftone processing.

The rasterization processing in step S4 is processing of rearranging the pixel data (for example, the 1-bit data in the present exemplary embodiment) aligned in a matrix pattern, according to a dot formation order for printing. The rasterization processing includes pass allocation processing of allocating the image data configured by the pixel data resulting from the halftone processing to each main scanning in which the head unit 50 discharges droplets while reciprocating. Once the pass allocation is completed, the actual nozzles 54 that form respective raster lines configuring the printing image are allocated.

The command addition processing in step S5 is processing of adding command data corresponding to a printing method, to the rasterized data. The command data includes, for example, transport data related to transport specifications (a movement amount in the transport direction, a speed, and the like) of the medium M, and the like. The rasterization processing and the command addition processing are performed by the print data generation unit, and print data is generated.

The print data transmission processing in step S6 is processing of transmitting the generated print data to the printing apparatus 100 via the interface unit 119.

The processing from step S1 to step S6 by the printer driver is performed by the ASIC 116 and the DSP 117 under the control of the CPU 115 (refer to FIG. 4).

Figure 6:
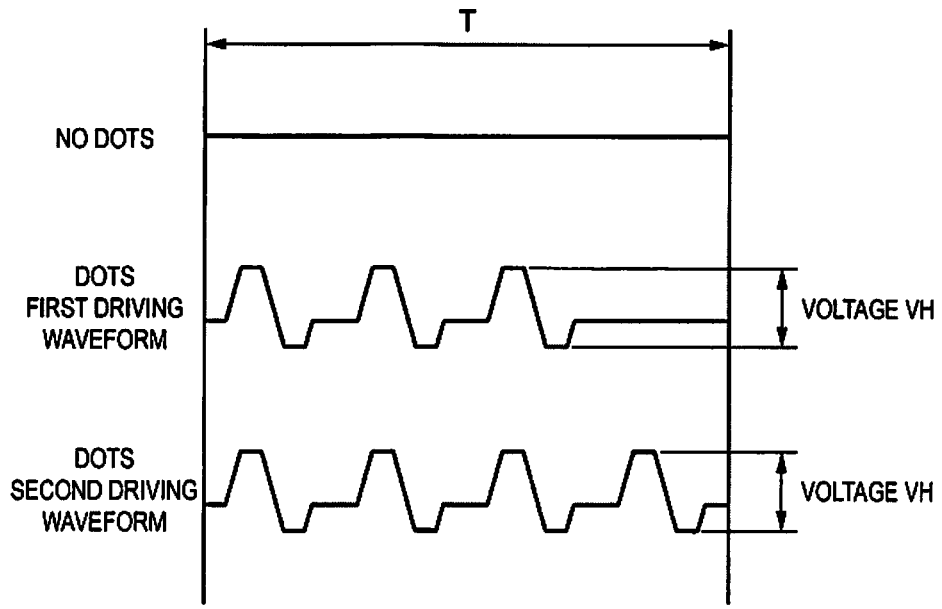
FIG. 6 is a diagram for explaining a driving waveform applied to a piezoelectric vibrator.
Figure 7:
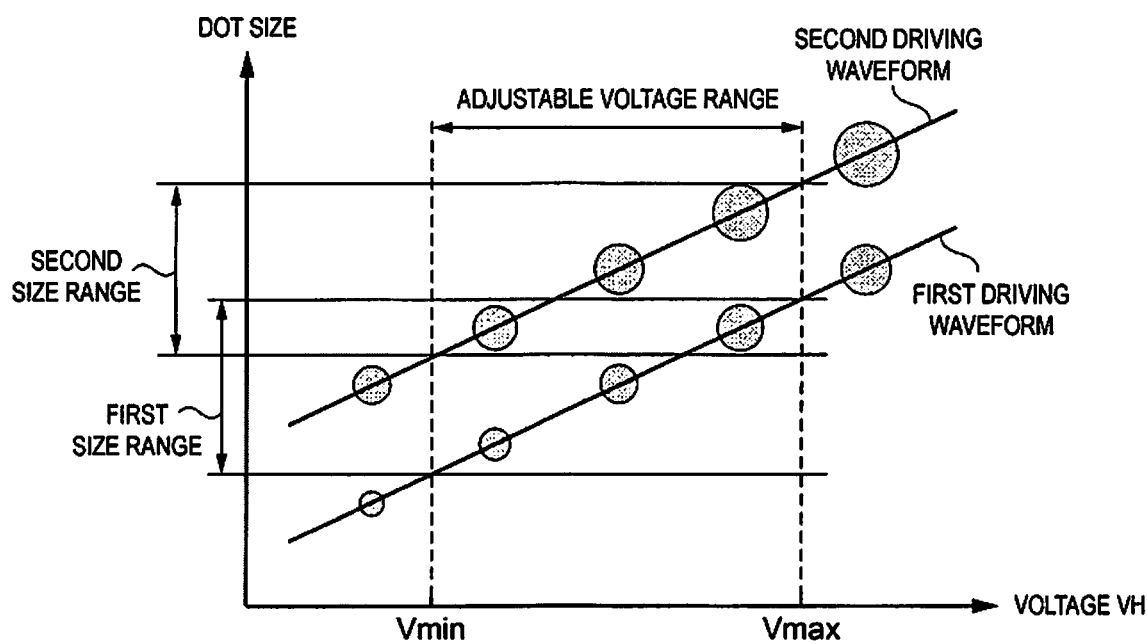
FIG. 7 is a diagram for explaining a dot size of a droplet discharged from a nozzle.

Next, the size of the droplet discharged from the nozzles 54 of each chip 52 will be described. FIG. 6 is a diagram for explaining a driving waveform applied to the piezoelectric vibrator. FIG. 7 is a diagram for explaining a dot size of a droplet discharged from the nozzle. Note that, in FIG. 7, an image of a changing dot size is indicated by surface areas illustrated by circles.

As illustrated in FIG. 6, when the image data generated by halftone processing is "DOT", the driving signal generating unit 4a generates one driving waveform of a first driving waveform and a second driving waveform that drives the piezoelectric vibrators 142 for the respective chips 52. When the image data generated by halftone processing is "NO DOT", a driving waveform is not generated. The size of the droplet (hereinafter referred to as "dot size") discharged from the nozzle 54 can be changed by the type of the driving waveform and a voltage VH. For example, in the first driving waveform, a change in the voltage VH that displaces the piezoelectric vibrators 142 is repeated three times in a predetermined period T. In the second driving waveform, a change in the voltage VH that displaces the piezoelectric vibrators 142 is repeated four times in the predetermined period T. The predetermined period T corresponds to a period when the nozzle 54 moves a distance corresponding to one pixel in the main scanning direction. For example, for a printing resolution of 720 dpi, the period T is equivalent to a period when the nozzle 54 moves 1/720 inches with respect to the medium M. Note that the number of times that the change in voltage VH is repeated in the predetermined period T is an example, and is not limited to the example.

FIG. 7 illustrates a relationship between the voltage VH applied to the first driving waveform and the second driving waveform, and dot size. The dot size of the droplet discharged from the nozzle 54 of each chip 52 changes in proportion to the voltage VH applied to the driving waveforms. Thus, an adjustable voltage range serving as a range in which the voltage VH can be applied is set for each of the chips 52. The adjustable voltage range is a range of the voltage VH in which mist does not readily occur and missing dots do not occur, is set by testing, and stored in the memory 5 for each of the chips 52 in advance.

The driving signal generating unit 4a discharges the droplet of a small dot within a first size range from the nozzle 54 by applying the voltage VH within the adjustable voltage range set for the chip 52 to the first driving waveform. Further, the driving signal generating unit 4a discharges the droplet of a large dot within a second size range including sizes larger than a largest dot within the first size range from the nozzle 54 by applying the voltage VH within the adjustable voltage range set for the chip 52 to the second driving waveform. Furthermore, the first size range and the second size range overlap. Specifically, the largest dot size within the first size range, which is a small dot discharged when a maximum voltage Vmax within the adjustable voltage range is applied to the first driving waveform, is larger than a smallest dot size within the second size range, which is a large dot discharged when a minimum voltage Vmin within the adjustable voltage range is applied to the second drive waveform.

Voltage Determination Method

Figure 8:
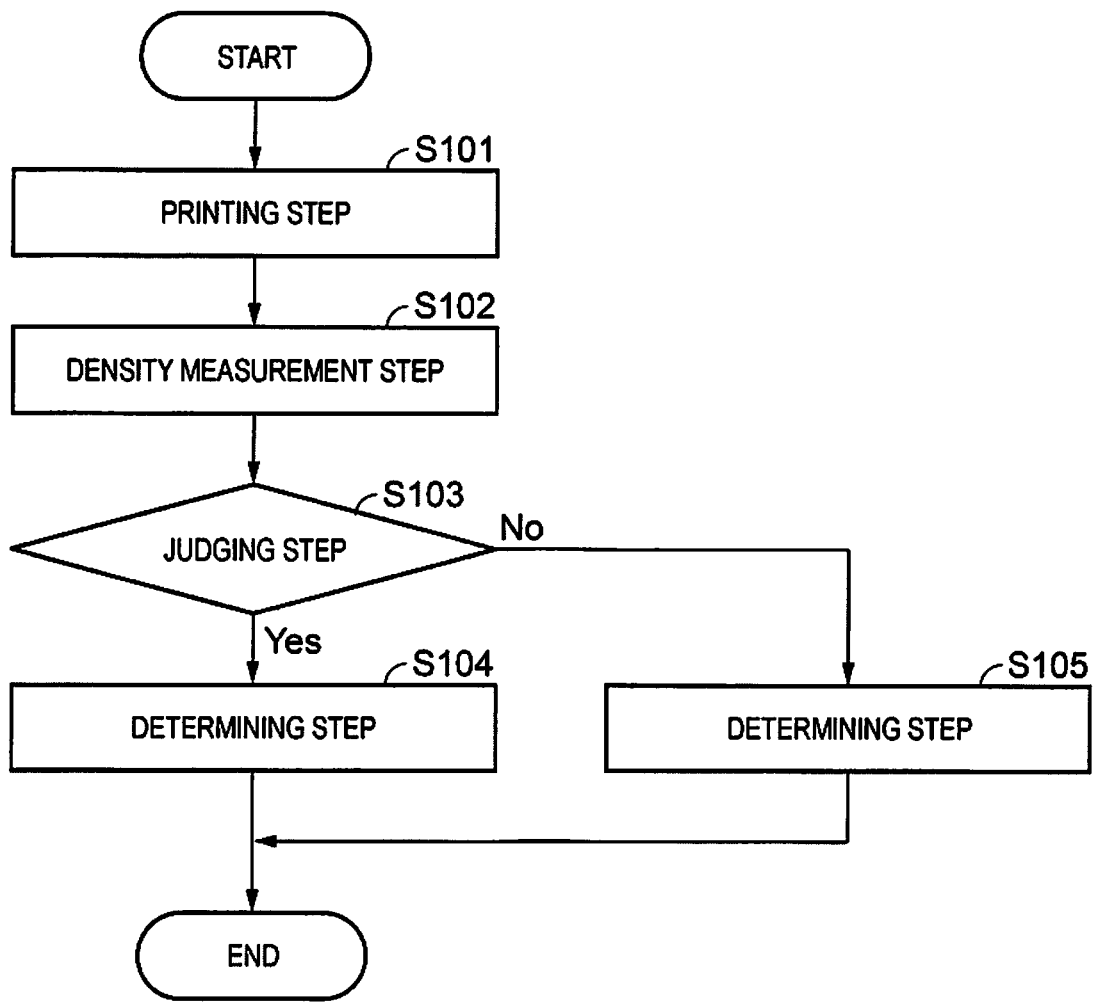
FIG. 8 is a flowchart for explaining a voltage determination method.

Next, the voltage determination method for determining the voltage to be applied during final printing to adjust the ink density will be described. FIG. 8 is a flowchart for explaining the voltage determination method.

As described above, when the chips 52 are manufactured by an MEMS manufacturing process applying a semiconductor process, the dot sizes of the droplets discharged from the nozzle 54 may differ due to individual differences of the chips 52. The dot size is proportional to density and thus, even when a predetermined voltage is applied using the first driving waveform, the densities of the dots discharged by each of the chips 52 are different. As a result, when printing is performed by the printing apparatus 100 of the present exemplary embodiment, a predetermined voltage is applied to the chip 52 using the first driving waveform to perform temporary printing prior to final printing, the density of the dots of the printed image is found, and the driving waveform and voltage to be applied to the chip 52 during final printing to achieve a target density are determined.

The voltage determination method for determining the voltage for printing during final printing will now be described. Note that this voltage determination method is performed for each of the four chips 52 that form the nozzle row 51 of the head unit 50 that discharges the same color. In the description below, the voltage determination method for setting the ink density of the four chips 52 that discharge an ink K to the target density is described.

Step S101 is a printing step for applying a predetermined voltage V0 using the first driving waveform to perform printing on the medium M. The driving signal generating unit 4a of the control unit 1 applies the predetermined voltage V0 using the first driving waveform. The four chips 52 that discharge the ink K each discharge a droplet from the nozzle 54 based on a control signal output from the discharge signal generating unit 4b of the control unit 1, and the movement unit 20 relatively moves the medium M and head unit 50 based on the control signal output from the movement signal generating unit 4c of the control unit 1, and thus a dot of the ink K is printed on the medium M.

Step S102 is a density measurement step for measuring the density of a dot printed on the medium M. The control unit 1 drives the imaging unit 70, and captures the image printed by dots on the medium M. The CPU 3 of the control unit 1 converts the captured image data to a CIELAB color space, and finds a brightness Lm of a dot serving as an index of the density of the dot. As a result, it is possible to continually perform the steps described below from the measurement of the brightness Lm of the dot as the density of the dot printed on the medium M. Note that while the brightness L* of the CIELAB color space is used as density in the present exemplary embodiment, the density may be a brightness L* of a CIELUV color space or the like.

Step S103 is a judging step for judging when the target density is achieved by a voltage change within the adjustable voltage range based on a density of a dot printed on the medium M and a target density. The target density is a desired density to be achieved when the voltage VH is applied to the first driving waveform and a dot is printed on the medium M. The target density of each color is stored in the memory 5 in advance as a target brightness Lt. As described above, the dot size is proportional to the voltage VH. For example, when the voltage VH increases, the dot size of the droplet becomes larger, and the density of the dot increases. That is, the brightness L* used as an index of density is expressed as a linear function that decreases substantially linearly relative to the voltage VH, and a coefficient of the function is stored in the memory 5 in advance.

Figure 9:
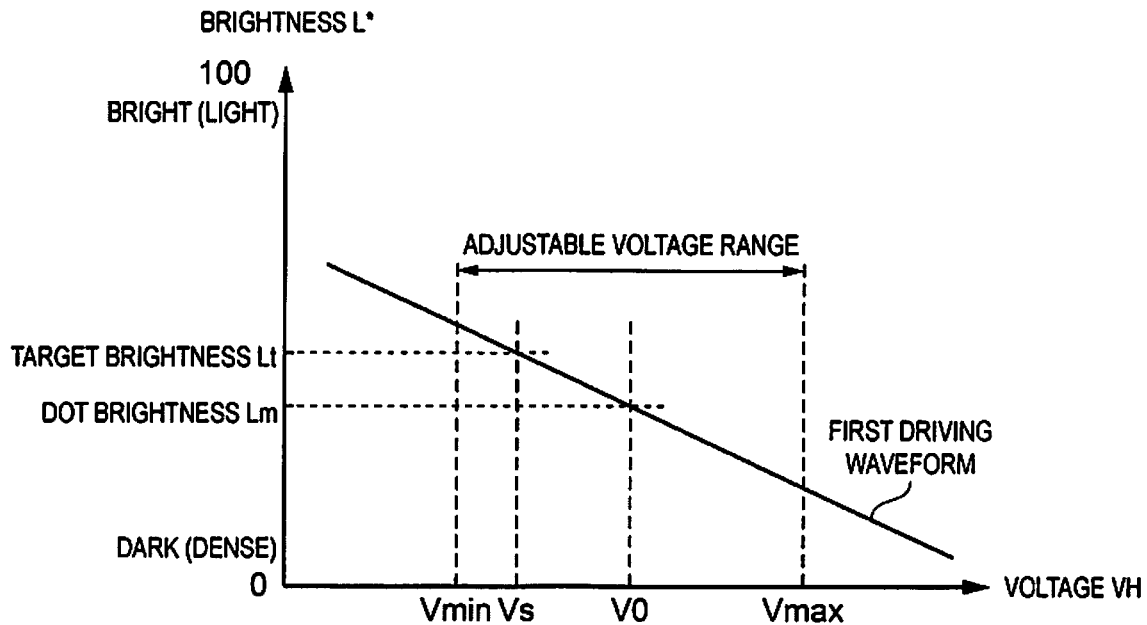
FIG. 9 is a diagram illustrating a relationship between a voltage VH and a brightness L'.
Figure 10:
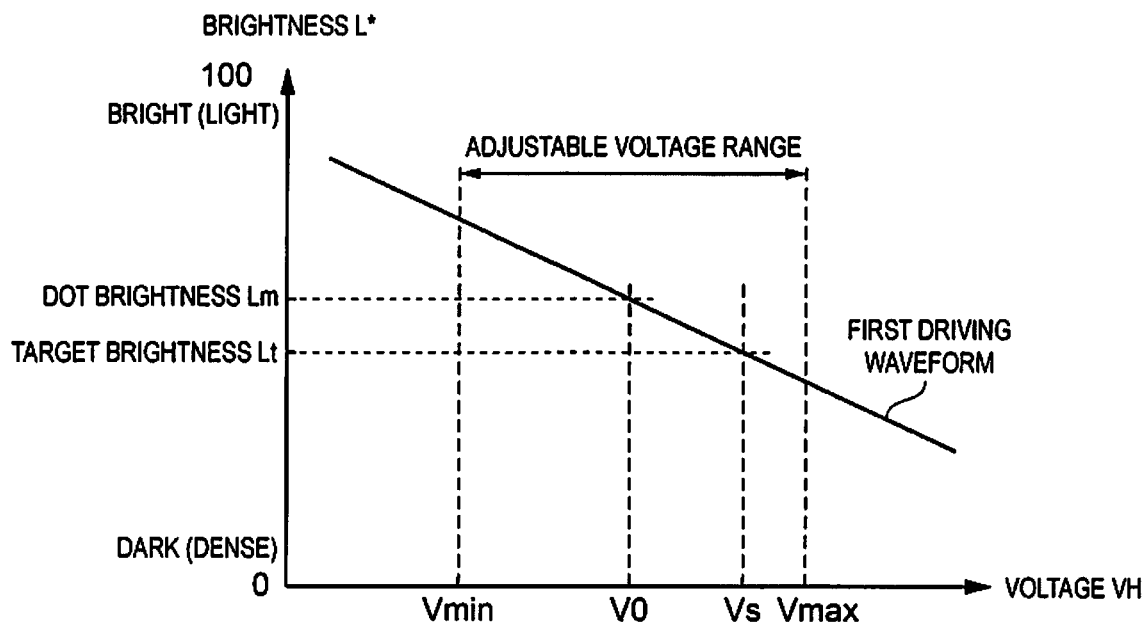
FIG. 10 is a diagram illustrating the relationship between the voltage VH and the brightness L*.
Figure 11:
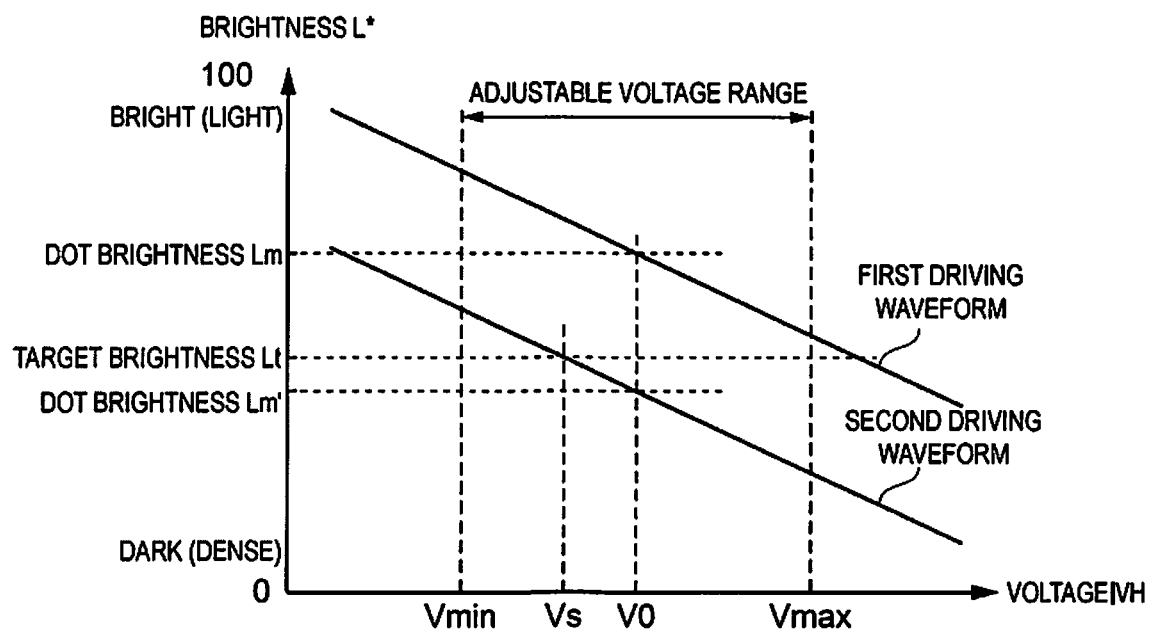
FIG. 11 is a diagram illustrating the relationship between the voltage VH and the brightness L'.

FIG. 9 to FIG. 11 are diagrams illustrating the relationship between the voltage VH and the brightness L*. FIG. 9 and FIG. 10 illustrate an example when the target brightness Lt is within the adjustable voltage range. FIG. 11 illustrates an example when the target brightness Lt is outside the adjustable voltage range. The CPU 3 calculates the brightness L* achieved when the upper limit Vmax and the lower limit Vmin of the adjustable voltage range are applied from the brightness Lm of the dot found in step S102 and the coefficient, and compares the brightness L* with the target brightness Lt. As illustrated in FIG. 9 and FIG. 10, when the CPU 3 judges that the target brightness Lt can be achieved by adjustment within the adjustable voltage range of the first driving waveform (step S103: Yes), the flow proceeds to step S104. As illustrated in FIG. 11, when an attempt is made to achieve the target brightness Lt using the first driving waveform, the voltage VH becomes the upper limit voltage Vmax of the adjustable voltage range or greater, and the CPU 3 judges that the target brightness Lt cannot be achieved by adjustment within the adjustable voltage range (step S103: No), the flow proceeds to step S105.

Step S104 is a determining step for determining the actual voltage VH to be used during final printing. As illustrated in FIG. 9 and FIG. 10, the CPU 3 finds a voltage Vs for achieving the target brightness Lt using the first driving waveform from a difference between the brightness Lm and the target brightness Lt of the dot as well as the coefficient, and determines this to be the voltage VH to be used during final printing.

Step S105 is a determining step for changing to the second driving waveform to determine the actual voltage VH to be used during final printing when the target brightness Lt serving as the target density is not achieved even when the voltage Vmax of the upper limit value within the adjustable voltage range is applied using the first driving waveform. As illustrated in FIG. 11, when the target brightness Lt is not achieved even when the voltage Vmax of the upper limit value is applied to the first driving waveform, the CPU 3 changes the driving waveform to the second driving waveform. The CPU 3 calculates a brightness Lm' of the dot when the predetermined voltage V0 is applied using the second driving waveform from the brightness Lm of the dot when the predetermined voltage V0 is applied using the first driving waveform, found in step S102.

As described above, the first driving waveform and the second driving waveform differ in terms of the number of times the voltage VH that displaces the piezoelectric vibrators 142 is changed in the predetermined period T. When the voltages VH are the same, the dot size of the large dot discharged with the second driving waveform is found from the difference in the number of times the voltage VH is changed. The dot size is proportional to the brightness L* serving as the density, making it possible to calculate the brightness Lm' of the dot from the brightness Lm of the dot. The CPU 3 finds the voltage Vs for achieving the target brightness Lt using the second driving wave from a difference between the brightness Lm' of the dot and the target brightness Lt as well as the coefficient, and determines this to be the voltage VH to be used during final printing. Note that when the target brightness Lt is not achieved even when the voltage Vmin of the lower limit value within the adjustable voltage range is applied using the first driving waveform, the CPU 3 determines that the voltage VH to be used for final printing is the voltage Vmin of the lower limit value.

The printing apparatus 100 and the voltage determination method change the driving waveform to the second driving waveform for discharging the large dot to determine the actual voltage VH to be used during final printing when the target brightness Lt is not achieved even when the voltage Vmax of the upper limit value within the adjustable voltage range is applied using the first driving waveform for discharging a small dot, making it possible to expand the adjustable range of the brightness L* serving as the density of the droplet discharged from the chip 52.

The first size range of a small dot discharged from the nozzle 54 by applying the voltage VH within the adjustable voltage range to the first driving waveform, and the second size range of a large dot discharged from the nozzle 54 by applying the voltage VH within the adjustable voltage range to the second driving waveform include an overlapping range. As a result, it is possible to favorably expand the adjustable range of the brightness L* serving as the density of the droplet.

The densities of the dots of the droplets discharged from the nozzle row 51 of the ink K can be aligned by performing step S103 to step S105 on the four chips 52 that discharge the ink K.

Note that in the exemplary embodiment, the serial-head type head unit being mounted on the carriage 32 configured to reciprocate, and being configured to discharge droplets while moving in the width direction (±X axis direction) of the medium M is exemplified as the head unit 50, but the head unit 50 may be a line-head type head unit provided with a plurality of the chips 52 and extending and fixed to be arranged in the width direction of the medium M.

Further, the printing apparatus 100 of the exemplary embodiment is described as including the imaging unit 70 and finding the brightness L* from image data captured by the imaging unit 70, but may be configured without being includes the imaging unit 70. The printing apparatus 100 may be configured so that a user measures the brightness L* of an image temporarily printed on the medium M using a spectrophotometer or the like, and inputs the value from the input unit 112.

As described above, according to the printing apparatus 100 and the voltage determination method of exemplary embodiment 1, the following effects can be obtained.

The control unit 1 of the printing apparatus 100 applies the predetermined voltage V0 using the first driving waveform for discharging a small dot within the first size range to perform temporary printing on the medium M, prior to final printing. When the brightness Lm of the temporarily printed dot and the target brightness Lt are compared, and the target brightness Lt is not achieved even when the voltage Vmax of the upper limit value within the adjustable voltage range is applied to the first driving waveform, the control unit 1 changes the first driving waveform to the second driving waveform for discharging a large dot to determine the actual voltage VH to be used during final printing. As a result, it is possible to expand the adjustable range of the brightness L* serving as the density of the droplet discharged from the chip 52.

The first size range of a small dot discharged from the nozzle 54 by applying the voltage VH within the adjustable voltage range to the first driving waveform, and the second size range of a large dot discharged from the nozzle 54 by applying the voltage VH within the adjustable voltage range to the second driving waveform include an overlapping range. As a result, it is possible to favorably expand the adjustable range of the brightness L* serving as the density of the droplet.

The printing apparatus 100 includes the imaging unit 70 as a measurement unit for measuring the density of a dot. Further, the control unit 1 finds the brightness L* serving as an index of the density of a dot from the image data captured by the imaging unit 70. As a result, it is possible to continually perform the steps from measuring the brightness Lm of the dot as the density of the dot printed on the medium M, to determining the actual voltage VH to be used during final printing.

In the voltage determination method of the present exemplary embodiment, in the printing step prior to final printing, the predetermined voltage V0 is applied using the first driving waveform for discharging a small dot within the first size range to perform temporary printing on the medium M. In the judging step, when the brightness Lm of the temporarily printed dot and the target brightness Lt are compared, and the target brightness Lt is not achieved even when the voltage Vmax of the upper limit value within the adjustable voltage range is applied to the first driving waveform, the control unit 1 changes the first driving waveform to the second driving waveform for discharging a large dot to determine the actual voltage VH to be used during final printing. As a result, it is possible to expand the adjustable range of the brightness L* serving as the density of the droplet discharged from the chip 52.

Exemplary Embodiment 2

Figure 12:
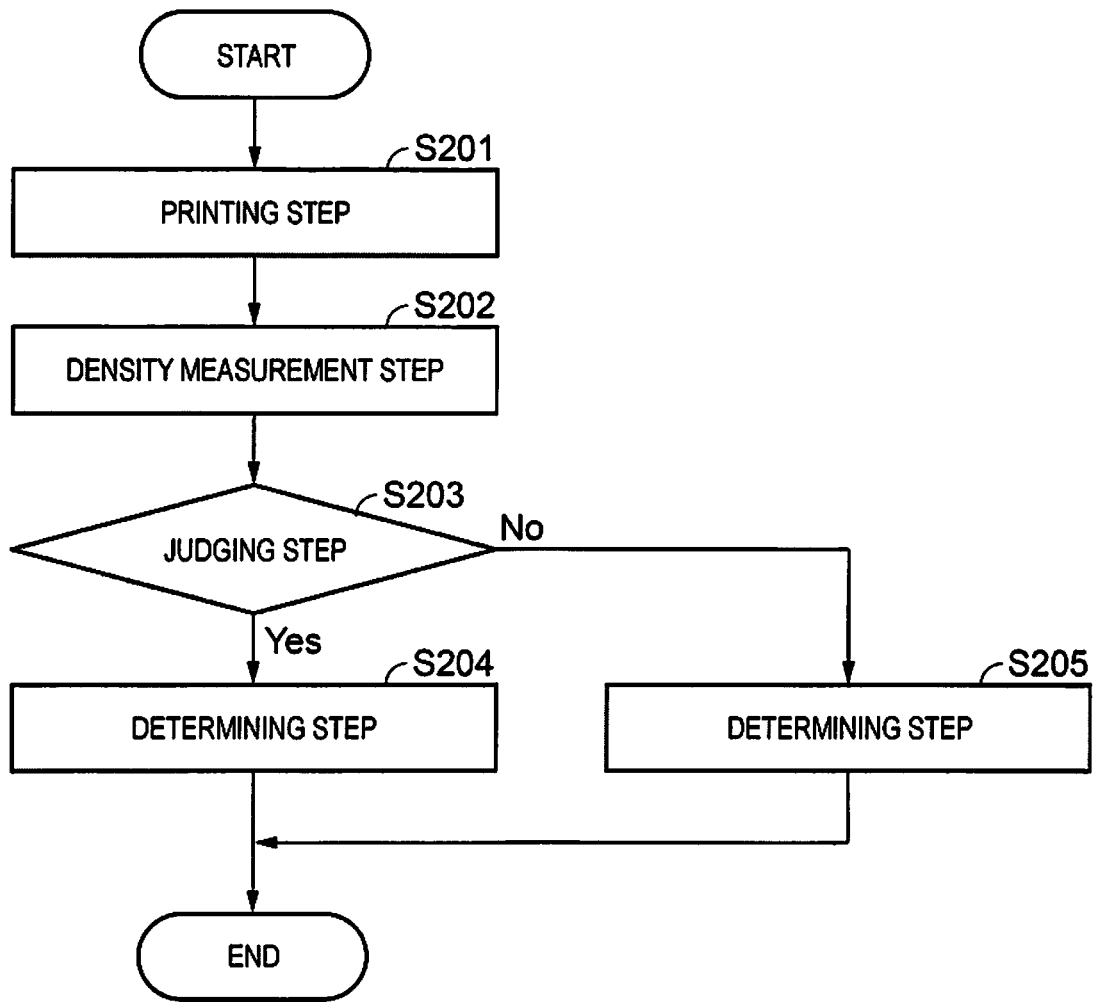
FIG. 12 is a flowchart for explaining the voltage determination method according to exemplary embodiment 2.

FIG. 12 is a flowchart for explaining the voltage determination method according to exemplary embodiment 2. The voltage determination method for determining the voltage to be applied during final printing to adjust the ink density will be described with reference to FIG. 12. Note that step S202 of the present exemplary embodiment is the same as step S102 described in Exemplary Embodiment 1, and thus a description of the step S202 is omitted.

Step S201 is a printing step for applying the predetermined voltage V0 using the second driving waveform to perform printing on the medium M. The driving signal generating unit 4a of the control unit 1 applies the predetermined voltage V0 using the second driving waveform. The four chips 52 that discharge the ink K each discharge a droplet from the nozzle 54 based on a control signal output from the discharge signal generating unit 4b of the control unit 1, and the movement unit 20 relatively moves the medium M and the head unit 50 based on the control signal output from the movement signal generating unit 4c of the control unit 1, and thus a dot of the ink K is printed on the medium M.

Step S203 is a judging step for judging when the target density is achieved by a voltage change within the adjustable voltage range based on a density of a dot printed on the medium M and a target density. The target density is a desired density to be achieved when the voltage VH is applied to the second driving waveform and a dot is printed on the medium M. The target density of each color is stored in the memory 5 in advance as the target brightness Lt. As described above, the dot size is proportional to the voltage VH. For example, when the voltage VH increases, the dot size of the droplet becomes larger, and the density of the dot increases. That is, the brightness L* used as an index of density is expressed as a linear function that decreases linearly relative to the voltage VH, and a coefficient of the function is stored in the memory 5 in advance.

Figure 13:
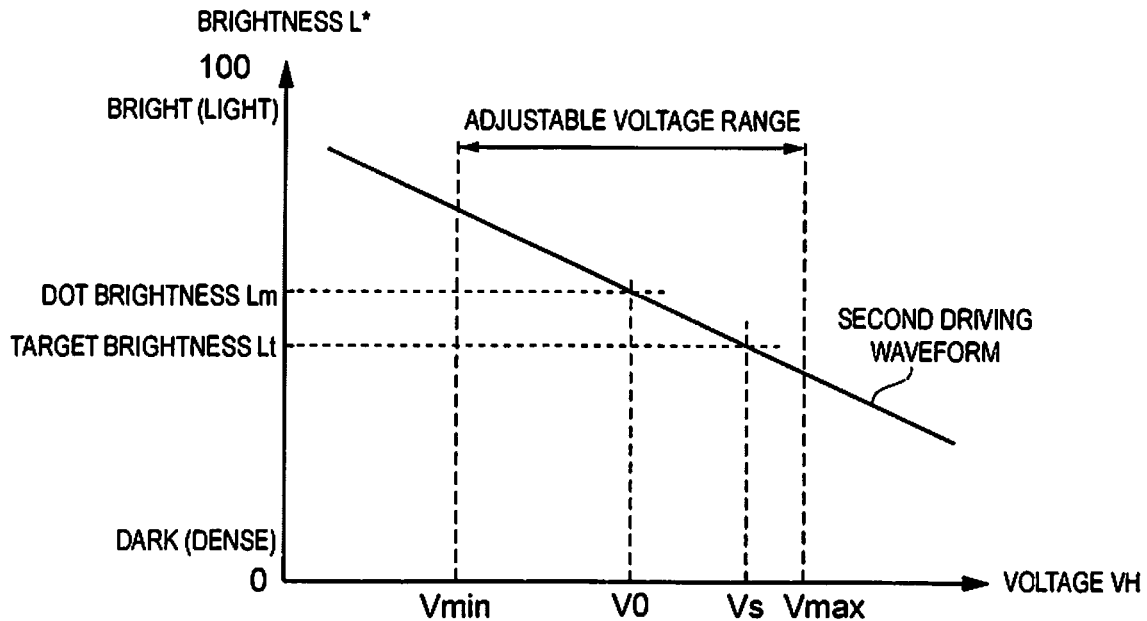
FIG. 13 is a diagram illustrating the relationship between the voltage VH and the brightness L*.
Figure 14:
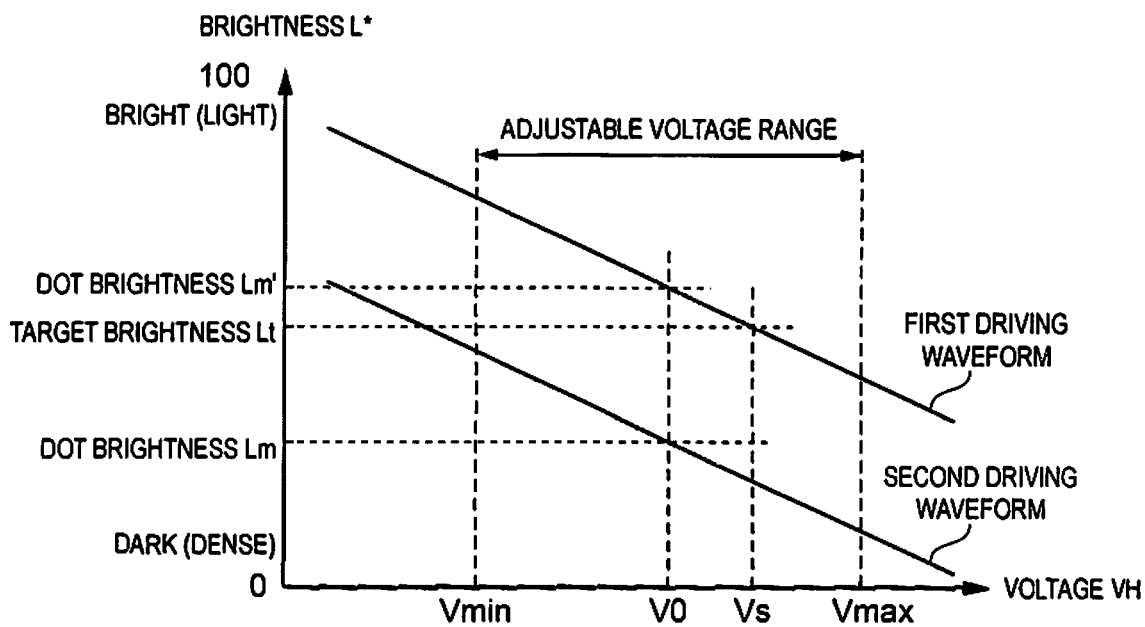
FIG. 14 is a diagram illustrating the relationship between the voltage VH and the brightness L*.

FIG. 13 and FIG. 14 are diagrams illustrating the relationship between the voltage VH and the brightness L*. FIG. 13 illustrates an example when the target brightness Lt is within the adjustable voltage range. FIG. 14 illustrates an example when the target brightness Lt is outside the adjustable voltage range. The CPU 3 calculates the brightness L* achieved when the upper limit Vmax and the lower limit Vmin of the adjustable voltage range are applied from the brightness Lm of the dot found in step S202 and the coefficient, and compares the brightness L* with the target brightness Lt. As illustrated in FIG. 13, when the CPU 3 judges that the target brightness Lt can be achieved by adjustment within the adjustable voltage range of the second driving waveform (step S203: Yes), the flow proceeds to step S204. As illustrated in FIG. 14, when an attempt is made to achieve the target brightness Lt using the second driving waveform, the voltage VH becomes the lower limit voltage Vmin of the adjustable voltage range or less, and the CPU 3 judges that the target brightness Lt cannot be achieved by adjustment within the adjustable voltage range (step S203: No), the flow proceeds to step S205.

Step S204 is a determining step for determining the actual voltage VH to be used during final printing. As illustrated in FIG. 13, the CPU 3 finds the voltage Vs for achieving the target brightness Lt using the second driving wave from a difference between the brightness Lm' of the dot and the target brightness Lt as well as the coefficient, and determines this to be the voltage VH to be used during final printing.

Step S205 is a determining step for changing the driving waveform to the first driving waveform to determine the actual voltage VH to be used during final printing when the target brightness Lt serving as the target density is not achieved even when the voltage Vmin of the lower limit value within the adjustable voltage range is applied using the second driving waveform. As illustrated in FIG. 14, when the target brightness Lt is not achieved even when the voltage Vmin of the lower limit value is applied to the second driving waveform, the CPU 3 changes the driving waveform to the first driving waveform. The CPU 3 calculates the brightness Lm' of the dot when the predetermined voltage V0 is applied using the first driving waveform from the brightness Lm of the dot when the predetermined voltage V0 is applied using the second driving waveform, found in step S202.

As described above, the first driving waveform and the second driving waveform differ in terms of the number of times the voltage VH that displaces the piezoelectric vibrators 142 is changed in the predetermined period T. When the voltages VH are the same, the dot size of the small dot discharged using the first driving waveform is found from the difference in the number of times the voltage VH is changed. The dot size is proportional to the brightness L* serving as the density, making it possible to calculate the brightness Lm' of the dot from the brightness Lm of the dot. The CPU 3 finds the voltage Vs for achieving the target brightness Lt using the first driving wave from a difference between the brightness Lm' of the dot and the target brightness Lt as well as the coefficient, and determines this to be the voltage VH to be used during final printing. Note that when the target brightness Lt is not achieved even when the voltage Vmax of the upper limit value within the adjustable voltage range is applied using the second driving waveform, the CPU 3 determines that the voltage VH to be used during final printing is the voltage Vmax of the upper limit value.

The printing apparatus 100 and the voltage determination method of the present exemplary embodiment change the driving waveform to the first driving waveform for discharging a small dot to determine the actual voltage VH to be used during final printing when the target brightness Lt is not achieved even when the voltage Vmin of the lower limit value within the adjustable voltage range is applied using the second driving waveform for discharging a large dot, making it possible to expand the adjustable range of the brightness L* serving as the density of the droplet discharged from the chip 52.

As described above, according to the printing apparatus 100 and the voltage determination method of the exemplary embodiment 2, the following effects can be obtained.

The control unit 1 of the printing apparatus 100 applies the predetermined voltage V0 using the second driving waveform for discharging a large dot within the second size range to perform temporary printing on the medium M, prior to final printing. When the brightness Lm of the temporarily printed dot and the target brightness Lt are compared, and the target density Lt is not achieved even when the voltage Vmin of the lower limit value within the adjustable voltage range is applied using the second driving waveform, the control unit 1 changes the second driving waveform to the first driving waveform for discharging a small dot to determine the actual voltage VH to be used during final printing. As a result, it is possible to expand the adjustable range of the brightness L* serving as the density of the droplet discharged from the chip 52.

In the voltage determination method of the present exemplary embodiment, in the printing step prior to final printing, the predetermined voltage V0 is applied using the second driving waveform for discharging a large dot within the second size range to perform temporary printing on the medium M. In the judging step, when the brightness Lm of the temporarily printed dot and the target brightness Lt are compared, and the target brightness Lt is not achieved even when the voltage Vmin of the lower limit value within the adjustable voltage range is applied using the second driving waveform, the control unit 1 changes the second driving waveform to the first driving waveform for discharging a small dot to determine the final voltage VH to be used during final printing. As a result, it is possible to expand the adjustable range of the density of the droplet discharged from the chip 52.

Note that the present disclosure is not limited to the exemplary embodiment described above, and the exemplary embodiment described above can be variously changed and modified. Such modified examples are described below. Further, note that the configurations as in the exemplary embodiment are referenced using like numbers, and duplicate descriptions for such configurations are omitted below.

Modified Example 1

The driving signal generating unit 4a of the printing apparatus 100 according to Modified Example 1 discharges the droplet of a small dot within the first size range from the nozzle 54 by applying the voltage VH within the adjustable voltage range set for the chip 52 to the first driving waveform. Further, the driving signal generating unit 4a discharges the droplet of a medium dot within the second size range including sizes larger than a largest dot within the first size range from the nozzle 54 by applying the voltage VH within the adjustable voltage range set for the chip 52 to the second driving waveform.

When the target brightness Lt is not achieved even when the voltage Vmax of the upper limit value within the adjustable voltage range is applied to the first driving waveform for discharging a small dot, the CPU 3 changes the first driving waveform to the second driving waveform for discharging a medium dot to determine the actual voltage VH to be used during final printing, making it possible to expand the adjustable range of the brightness L* serving as the density of the droplet discharged from the chip 52.

Modified Example 2

The driving signal generating unit 4a of the printing apparatus 100 according to Modified Example 2 discharges the droplet of a medium dot within the first size range from the nozzle 54 by applying the voltage VH within the adjustable voltage range set for the chip 52 to the first driving waveform. Further, the driving signal generating unit 4a discharges the droplet of a large dot within a second size range including sizes larger than a largest dot within the first size range from the nozzle 54 by applying the voltage VH within the adjustable voltage range set for the chip 52 to the second driving waveform.

When the target brightness Lt is not achieved even when the voltage Vmax of the upper limit value within the adjustable voltage range is applied to the first driving waveform for discharging a medium dot, the CPU 3 changes the first driving waveform to the second driving waveform for discharging a large dot to determine the actual voltage VH to be used during final printing, making it possible to expand the adjustable range of the brightness L* serving as the density of the droplet discharged from the chip 52.

Modified Example 3

The driving signal generating unit 4a of the printing apparatus 100 according to Modified Example 3 discharges the droplet of a small dot within the first size range from the nozzle 54 by applying the voltage VH within the adjustable voltage range set for the chip 52 to the first driving waveform. Further, the driving signal generating unit 4a discharges the droplet of a medium dot within a third size range including sizes larger than a largest dot within the first size range from the nozzle 54 by applying the voltage VH within the adjustable voltage range set for the chip 52 to a third driving waveform. Further, the driving signal generating unit 4a discharges the droplet of a large dot within the second size range including sizes larger than a largest dot within the third size range from the nozzle 54 by applying the voltage VH within the adjustable voltage range set for the chip 52 to the second driving waveform.

When the target brightness Lt is not achieved even when the voltage Vmin of the lower limit value within the adjustable voltage range is applied to the third driving waveform for discharging a medium dot, the CPU 3 changes the third driving waveform to the first driving waveform for discharging a small dot to determine the actual voltage VH to be used during final printing. When the target brightness Lt is not achieved even when the voltage Vmax of the upper limit value within the adjustable voltage range is applied using the third driving waveform for discharging a medium dot, the CPU 3 changes the third driving waveform to the second driving waveform for discharging a large dot to determine the actual voltage VH to be used during final printing. As a result, it is possible to further expand the adjustable range of the brightness L* serving as the density of the droplet discharged from the chip 52.

The first size range of the small dot discharged based on the first driving waveform and the adjustable voltage range, and the third size range of the medium dot discharged based on the third driving waveform and the adjustable voltage range overlap. Further, the third size range of the medium dot and the second size range of the large dot discharged based on the second driving waveform and the adjustable voltage range overlap. As a result, it is possible to favorably expand the adjustable range of the brightness L" serving as the density of the droplet.

In each of the above-mentioned exemplary embodiments, other apparatuses may have at least part of the functions of the print control apparatus 110. Further, the printing apparatus may have all the functions of the print control apparatus 110. Such a configuration can also exert effects similar to those in the above-mentioned exemplary embodiments.

Contents derived from the exemplary embodiments will be described below.

A printing apparatus according to this patent application includes a chip including a nozzle, and a control unit including a voltage application unit configured to apply a voltage within an adjustable voltage range set for the chip to one of a first driving waveform for discharging a small dot within a first size range and a second driving waveform for discharging a large dot within a second size range including a size, which is larger than a largest dot within the first size range, to discharge a droplet from the nozzle. The control unit is configured to perform printing on a medium by applying to the chip a predetermined voltage using the first driving waveform, judge, based on a density of the dot printed on the medium and a target density, whether the target density is attainable by a voltage change within the adjustable voltage range, and determine, in a case where the target density is not attained even when a voltage of an upper limit value of the adjustable voltage range is applied using the first driving waveform, an actual voltage to be used during final printing, with the driving waveform being changed over to the second driving waveform.

According to this configuration, the printing apparatus includes a chip including a nozzle, and a control unit including a voltage application unit configured to apply a voltage for discharging a droplet from the nozzle. The control unit prints on the medium by applying the predetermined voltage using the first driving waveform for discharging a small dot within the first size range to the chip, prior to final printing. Then, when it is judged that the target density cannot be achieved by applying the voltage of the upper limit value within the adjustable voltage range based on the density of the printed dot and the target density, the control unit changes the driving waveform to the second driving waveform for discharging a large dot within the second size range to determine the actual voltage to be used during final printing. That is, the control unit, in the final printing, applies the actual voltage within the adjustable voltage range to the second driving waveform capable of discharging a large dot of a size larger than the largest dot within the first size range from the nozzle, achieving the target density of the droplet. As a result of this configuration, it is possible to expand the adjustable range of the density of the droplet in a printing apparatus in which the adjustable voltage range is set.

A printing apparatus according to this patent application includes a chip including a nozzle, and a control unit including a voltage application unit configured to apply a voltage within an adjustable voltage range set for the chip to one of a first driving waveform for discharging a small dot within a first size range and a second driving waveform for discharging a large dot within a second size range including a size, which is larger than a largest dot within the first size range, to discharge a droplet from the nozzle. The control unit is configured to perform printing on a medium by applying a predetermined voltage to the chip using the second driving waveform, judge, based on a density of the dot printed on the medium and a target density, whether the target density is attainable by a voltage change within the adjustable voltage range, and determine, in a case where the target density is not attained even when a voltage of a lower limit value of the adjustable voltage range is applied using the second driving waveform, an actual voltage to be used during final printing, with the driving waveform being changed over to the first driving waveform.

According to this configuration, the printing apparatus includes a chip including a nozzle, and a control unit including a voltage application unit configured to apply a voltage for discharging a droplet from the nozzle. The control unit prints on the medium by applying the predetermined voltage using the second driving waveform for discharging a large dot within the second size range, prior to final printing. Then, when it is judged that the target density cannot be achieved by applying the voltage of the lower limit value within the adjustable voltage range based on the density and the target density of the printed dot, the control unit changes the driving waveform to the first driving waveform for discharging a small dot within the first size range to determine the actual voltage to be used during final printing. That is, the control unit, in the final printing, applies the actual voltage within the adjustable voltage range to the first driving waveform capable of discharging a small dot of a size smaller than the smallest dot within the second size range from the nozzle, achieving the target density of the droplet. As a result of this configuration, it is possible to expand the adjustable range of the density of the droplet in a printing apparatus in which the adjustable voltage range is set.

Preferably, in the printing apparatus described above, the first size range and the second size range overlap.

According to this configuration, the first size range of a droplet discharged using the first driving waveform, and the second size range of the droplet discharged using the second driving waveform overlap. The size of the droplet is proportional to the density, and can thus favorably expand the adjustable range of the density of the droplet.

Preferably, the printing apparatus described above further includes a measurement unit configured to measure a density of the dot printed on the medium.

According to this configuration, the printing apparatus includes a measurement unit for measuring the density of a dot, making it possible to continually determine the actual voltage from the measurement of the density of the dot printed on the medium.

A voltage determination method according to this patent application is a voltage determination method of determining a voltage to be applied during final printing in a printing apparatus including a chip including a nozzle, and a control unit including a voltage application unit configured to apply a voltage within an adjustable voltage range set for the chip to one of a first driving waveform for discharging a small dot within a first size range and a second driving waveform for discharging a large dot within a second size range including a size, which is larger than a largest dot within the first size range, to discharge a droplet from the nozzle. The voltage determination method includes performing printing on a medium by applying to the chip a predetermined voltage using the first driving waveform, judging, based on a density of the dot printed on the medium and a target density, whether the target density is attainable by a voltage change within the adjustable voltage range, and determining, in a case where the target density is not attained even when a voltage of an upper limit value of the adjustable voltage range is applied using the first driving waveform, an actual voltage to be used during final printing, with the driving waveform being changed over to the second driving waveform.

According to this method, in the printing step, the control unit prints on the medium by applying the predetermined voltage using the first driving waveform for discharging a small dot to the chip within the first size range, prior to final printing. In the judging step, the control unit judges when the target density is achieved by a voltage change within the adjustable voltage range based on the density of the printed dot and the target density. In the determining step, when it is judged that the target density cannot be achieved by applying the voltage of the upper limit value within the adjustable voltage range, the control unit changes the driving waveform to the second driving waveform for discharging a large dot within the second size range to determine the actual voltage to be used during final printing. That is, in a step for performing final printing, the control unit applies the actual voltage within the adjustable voltage range to the second driving waveform capable of discharging a large dot of a size larger than the largest dot within the first size range from the nozzle, achieving the target density of the droplet. As a result of this voltage determination method, it is possible to expand the adjustable range of the density of the droplet in a printing apparatus in which the adjustable voltage range is set.

A voltage determination method according to this patent application is a voltage determination method of determining a voltage to be applied during final printing in a printing apparatus including a chip including a nozzle, and a control unit including a voltage application unit configured to apply a voltage within an adjustable voltage range set for the chip to one of a first driving waveform for discharging a small dot within a first size range and a second driving waveform for discharging a large dot within a second size range including a size, which is larger than a largest dot within the first size range, to discharge a droplet from the nozzle. The voltage determination method includes performing printing on a medium by applying to the chip a predetermined voltage using the second driving waveform, judging, based on a density of the dot printed on the medium and a target density, whether the target density is attainable by a voltage change within the adjustable voltage range, and determining, in a case where the target density is not attained even when a voltage of a lower limit value of the adjustable voltage range is applied using the second driving waveform, an actual voltage to be used during final printing, with the driving waveform being changed over to the first driving waveform.

According to this method, in the printing step, the control unit prints on the medium by applying the predetermined voltage using the second driving waveform for discharging a large dot within the second size range to the chip, prior to final printing. In the judging step, the control unit judges when the target density is achieved by a voltage change within the adjustable voltage range based on the density of the printed dot and the target density. In the determining step, when it is judged that the target density cannot be achieved by applying the voltage of the lower limit value within the adjustable voltage range, the control unit changes the driving waveform to the first driving waveform for discharging a small dot within the first size range to determine the actual voltage used during final printing. That is, in a step for performing final printing, the control unit applies the actual voltage within the adjustable voltage range to the first driving waveform capable of discharging a small dot of a size smaller than the smallest dot within the second size range from the nozzle, achieving the target density of the droplet. As a result of this voltage determination method, it is possible to expand the adjustable range of the density of the droplet in a printing apparatus in which the adjustable voltage range is set.

What is claimed is:

1. A printing apparatus comprising:
   a chip including a nozzle; and
   a control unit including a voltage application unit configured to apply a voltage within an adjustable voltage range set for the chip to one of a first driving waveform for discharging a small dot within a first size range and a second driving waveform for discharging a large dot within a second size range including a size, which is larger than a largest dot within the first size range, to discharge a droplet from the nozzle, wherein
   the control unit is configured to
   perform printing on a medium by applying to the chip a predetermined voltage using the first driving waveform,
   judge, based on a density of the dot that has been printed on the medium by applying the predetermined voltage using the first driving waveform, whether a voltage required for obtaining a target density using the first driving waveform is within the adjustable voltage range, and
   determine, in a case where the voltage required for obtaining the target density using the first driving waveform is more than an upper limit value of the adjustable voltage range, an actual voltage to be applied during final printing using the second driving waveform.

2. The printing apparatus according to claim 1, wherein the first size range and the second size range overlap.

3. The printing apparatus according to claim 1, further comprising a measurement unit configured to measure a density of the dot printed on the medium.

4. A voltage determination method of determining a voltage to be applied during final printing in a printing apparatus including a chip including a nozzle, and a control unit including a voltage application unit configured to apply a voltage within an adjustable voltage range set for the chip to one of a first driving waveform for discharging a small dot within a first size range and a second driving waveform for discharging a large dot within a second size range including a size, which is larger than a largest dot within the first size range, to discharge a droplet from the nozzle, the voltage determination method comprising:
   performing printing on a medium by applying to the chip a predetermined voltage using the first driving waveform;
   judging, based on a density of the dot that has been printed on the medium by applying the predetermined voltage using the first driving waveform, whether a voltage required for obtaining a target density using the first driving waveform is within the adjustable voltage range; and
   determining, in a case where the voltage required for obtaining the target density using the first driving waveform is more than an upper limit value of the adjustable voltage range, an actual voltage to be applied during final printing using the second driving waveform.

* * * * *